United States Patent Office 3,010,942
Patented Nov. 28, 1961

3,010,942
FLAME-RESISTANT SPIROBI(META-DIOXANE) PHENOLIC POLYMERS
Howard R. Guest, Charleston, and Ben W. Kiff, Ona, W. Va., assignors to Union Carbide Corporation, a corporation of New York
No Drawing. Filed Aug. 29, 1958, Ser. No. 757,900
15 Claims. (Cl. 260—47)

This invention relates to a new class of resins derived from 3,9-dialkenylspirobi(meta-dioxane derivatives. In a particular aspect, this invention relates to resins containing spirobi(meta-dioxane) and phenolic groups, and chemically-bound phosphorus.

Resins formed by the polymerization of spirobi(meta-dioxane) derivatives with phenols have many properties which make them commercially attractive. They are hard and tough and can be made with good clarity and color. However, in common with most other organic plastic materials commercially available, they suffer the disadvantage of being flammable. In many applications, particularly in the structural field, there would be great advantage in having strong, tough, rigid plastics with excellent weatherability characteristics which at the same time were flame-resistant.

A conventional method of reducing the flammability of a plastic is to incorporate mechanically a phosphorus-containing plasticizer into the plastic by milling or other similar operation. Considerable quantities of such plasticizers are required to produce this flame-resistance property in the plastic. Usually the plasticizer modifies other properties of the plastic in a beneficial way at the same time. Plasticizers of this type include compounds such as tricresyl phosphate and trioctyl phosphate.

This method of reducing the flammability of plastics with phosphorus-containing plasticizers is not practical for polymers produced from spirobi(meta-dioxane) derivatives. These polymers are not compatible with many of the phosphorus-containing plasticizers, and when proper compatability between the polymer and plasticizer is accomplished it is found that many of the desirable properties of the polymer are adversely affected. Further, no additive is known which can be mixed mechanically with spirobi(meta-dioxane) polymers to produce flame-resistant compositions.

It is a main object of this invention to provide flame-resistant spirobi(meta-dioxane) phenolic polymers and a process for their preparation. Other objects and advantages of this invention will become apparent to those skilled in the art from the accompanying description and disclosure.

Accordingly, flame-resistant polymers are produced by interpolymerizing a 3,9-dialkenylspirobi(meta-dioxane) derivative with a phenol and "condensed" phosphoric acids. The polymers so produced contain chemically-bound phosphorus as a substantive part of the polymers. The 3,9 - dialkenylspirobi(meta-dioxane) derivatives contemplated are those having an alkenyl substituent in the three-position and in the nine-position, each alkenyl substituent containing between two and about eighteen carbon atoms. The alkenyl substituents in the spirobi (meta-dioxane) derivative can be identical or they can be different. These spirobi acetals can also be designated as 3,9-dialkenyl-2,4,8,10-tetraoxaspiro(5.5)undecane. A particularly useful group of these unsaturated spirobi acetal compounds are those derived from the reaction of acrolein and substituted acroleins with pentaerythritol. Such unsaturated acetals may be represented by the formula:

$$R_2HC=\overset{R_1}{\underset{|}{C}}-CH\underset{OCH_2}{\overset{OCH_2}{<}}\underset{CH_2O}{\overset{CH_2O}{>}}C\underset{CH_2O}{\overset{CH_2O}{<}}HC-\overset{R_1}{\underset{|}{C}}=CHR_2$$

wherein $R_1$ is hydrogen, methyl or chlorine, and $R_2$ is hydrogen or methyl.

The unsaturated acetals particularly preferred in the practice of this invention include:

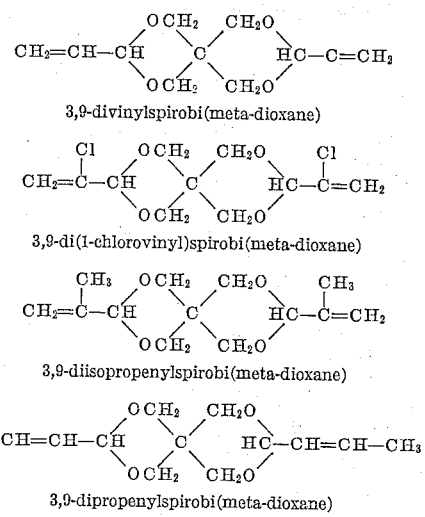

3,9-divinylspirobi(meta-dioxane)

3,9-di(1-chlorovinyl)spirobi(meta-dioxane)

3,9-diisopropenylspirobi(meta-dioxane)

3,9-dipropenylspirobi(meta-dioxane)

Unsaturated spirobi(meta-dioxane) derivatives are readily prepared by the condensation of a mole of pentaerythritol with two moles of an unsaturated aldehyde or ketone, or mixtures thereof, in the presence of an acid catalyst such as p-toluenesulfonic acid. The following reaction schemes are particular illustrations of the general synthetic method. When acrolein is employed, an unsubstituted 3,9-divinylspirobi(meta-dioxane) is obtained.

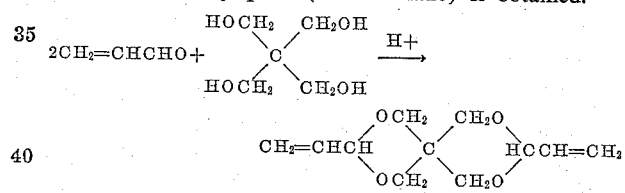

When the condensation is conducted with an unsaturated ketone then the three- and nine-positions of the spirobi (meta-dioxane) nucleus obtained have two substituents rather than one:

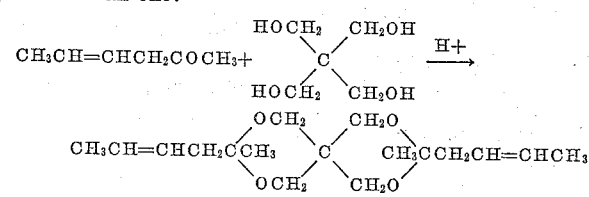

It is not necessary that the unsaturated aldehyde or ketone reacted with pentaerythritol be pure or a single species. Mixtures of unsaturated aldehydes and/or ketones may be condensed with pentaerythritol. The resulting products are mixtures of 3,9-(olefinically-substituted)spirobi(meta-dioxane) compounds which may be resolved into pure components or which may be used as crude mixtures directly in polymerization reactions.

By "condensed" phosphoric acids as used herein is meant the group of acids which are commonly represented by the formula:

$$H-(PO_3H)_x-OH$$

or

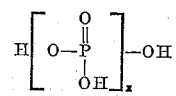

wherein X is greater than 1.

The simplest member of this class is pyrophosphoric acid, $H_4P_2O_7$. A mixture of "condensed" phosphoric acids is prepared by mixing together about 2 to 3 parts by weight of ortho-phosphoric acid ($H_3PO_4$) with one part by weight of phosphorus pentoxide ($P_2O_5$) and heating the mixture at a temperature between about 60° C. and 150° C. for a period of time between about 10 and 60 minutes. "Condensed" phosphoric acids have free hydroxyl groups

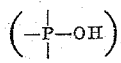

which are capable of cross-linking with unsaturated spirobi acetals.

The phenol derivatives which can be employed in the practice of this invention are the compounds of this class which contain at least two positions ortho or para to a phenolic hydroxyl group on an aromatic hydrocarbon nucleus which are susceptible to substitution reactions, e.g., compounds having positions ortho and para to a phenolic hydroxyl group which contain an active hydrogen substituent that can be displaced by an electrophilic reagent. The phenols contemplated include mononuclear phenols such as phenol, chlorophenol, resorcinol, p-phenylphenol, phloroglucinol, hydroquinone, cresol, m-xylenol, beta-naphthol, mixtures of phenols from coal tar or coal hydrogenation fractions, and the like; dinuclear phenols such as 2,2-bis(p-hydroxyphenyl)propane, bis(p-hydroxylphenyl)methane and isomeric diphenylol methanes disclosed in Bender et al., United States Patent No. 2,744,882, and the diphenols disclosed in Bender et al., United States Patent No. 2,506,486, and the like; trinuclear phenols such as 1,1,3-tris(hydroxyphenyl)propane, 1,1,3-tris(hydroxytolyl)propane, 1,1,3-tris(hydroxyphenyl)propene-2, 1,1,3-tris(hydroxyphenyl)-2-methylpropane, and the like; and other higher polynuclear phenols. The terms "mononuclear phenol," "dinuclear phenol," etc., designate the number of aromatic hydrocarbon nuclei in a compound containing at least one phenolic hydroxyl group. For example, by "mononuclear phenol" is meant a compound having one aromatic hydrocarbon nucleus which contains one or more phenolic hydroxy groups such as cresol and resorcinol. The expression "a phenol" as used hereinafter is meant to include all phenol derivatives within the scope of the foregoing definition.

The reaction for producing flame-resistant spirobi-(meta-dioxane) polymers can be conducted simply by heating a mixture of 3,9-dialkenylspirobi(meta-dioxane), a phenol and "condensed" phosphoric acids at reaction temperature, e.g., between about 100° C. and 150° C. The polymerization may require a reaction period of sixteen hours or longer at the lower reaction temperatures, and a reaction period of less than one hour may be satisfactory to complete the curing of the polymer product at the higher temperatures.

The relative concentrations of the reactants can be varied over a wide range in producing the flame-resistant resins. For example, phenol has three reactive ortho and para positions (trifunctional) and 3,9-dialkenylspirobi(meta-dioxane) has two double bonds (difunctional) so that the theoretical combining ratio is one and one-half moles of 3,9-dialkenylspirobi(meta-dioxane) for every mole of phenol. Resins with desirable properties can be produced over the range of between one mole and three moles of 3,9-dialkenylspirobi(meta-dioxane) for every mole of phenol. Generally, it is practical to use not less than one and one-half moles of 3,9-dialkenylspirobi(meta-dioxane) for each mole of phenol reacted. Preferably, a quantity of 3,9-dialkenylspirobi(meta-dioxane) is employed which is equivalent to the functionality of both the phenol and the "condensed" phosphoric acids. As mentioned previously, the "condensed" phosphoric acids have free hydroxyl groups which react with olefinic groups during the polymerization reaction.

The quantity of "condensed" phosphoric acids employed is not narrowly critical. The phosphoric acids are incorporated into the resin in an amount which is preferably between about 3 percent and 15 percent of the weight of reactants, i.e., the total weight of 3,9-dialkenylspirobi(meta-dioxane), phenol derivative and "condensed" phosphoric acids. Quantities less than about 3 percent by weight can be incorporated into the compositions but it has been found in many cases that the resins containing these lesser quantities of "condensed" phosphoric acids support combustion and are not self-extinguishing. Similarly, quantities of "condensed" phosphoric acids in excess of about 15 percent by weight of the total weight of reactants polymerized can be employed if desired. However, such larger quantities of "condensed" phosphoric acids do not appreciably increase the flame-resistance of the resins and they may deleteriously affect other characteristics of the resins.

Although the "condensed" phosphoric acids are acidic in nature and can act as a catalyst, it is more convenient to conduct the polymerization reaction in the presence of an acidic curing catalyst to promote a reasonable reaction rate. Satisfactory curing catalysts include acidic catalysts such as sulfuric acid, toluenesulfonic acid, benzenesulfonic acid, boron trifluoride, aluminum chloride, dialkyl sulfates such as diethyl sulfate, dimethyl sulfate and diisopropyl sulfate, and titanium tetrachloride, phenyl acid phosphate, octylphenyl acid phosphate, and the like. Curing catalyst concentrations can vary from as little as 0.1 weight percent for the more active catalysts, up to 1.0 weight percent or higher for the less active catalysts, based on the weight of reactants.

In another method found convenient for preparing flame-resistant polymers, 3,9-dialkenylspirobi(meta - dioxane) and a phenol are reacted together in suitable proportions in a first reaction stage to produce a liquid precondensate A-stage resin in the presence of an acid catalyst. A small portion of the "condensed" phosphoric acids which is to be incorporated into the resin in a second reaction stage can be employed as a catalyst in the pre-condensate polymerization stage, or some other acid catalyst can be employed. The precondensate polymerization reaction is conducted at a temperature between about 100° C. and 150° C. for a period of time between one-half hour and five hours depending on the viscosity desired for the A-stage resin. After volatile materials have been removed by distillation, the A-stage resin is usually a viscous liquid which slowly condenses to a solid plastic on standing. For practical purposes, the condensation can be stopped by neutralization or removal of the catalyst. The neutral A-stage resin can be stored until needed.

Flame-resistant polymers are prepared from the liquid A-stage resin condensate by mixing a calculated quantity of "condensed" phosphoric acids into the said resin, or adding the remaining quantity of "condensed" phosphoric acids if some has been used as a catalyst in the preparation of the A-stage resin, and heating the mixture until complete curing is obtained. A curing catalyst is also added to the mixture prior to the polymerization reaction, unless a catalyst employed for preparing the liquid A-stage resin is still present in the mixture in a sufficient quantity to promote the formation of a cured flame-resistant resinous product. This final cure can be accomplished at the same temperature used for the formation of the intermediate A-stage resin, or at higher temperatures.

The flame-resistant spirobi(meta-dioxane) phenolic polymers of this invention can be employed to produce molded articles, laminates, or any product for which other thermosetting resins are used. They can be cured in any desirable shape or form. These polymers have the advantage of being self-extinguishing when ignited, besides being strong, tough and rigid.

These flame-resistant polymers also have the advantage over many other thermoset resins in that they cure without the formation of volatile by-products, such as water, and there is little or no shrinkage during the curing process.

The following examples will serve to illustrate specific embodiments of this invention. The first three examples demonstrate the flammability of spirobi(meta-dioxane) phenolic resins which do not contain polymer-bound phosphorus.

*Example 1*

A charge of 3,9-divinylspirobi(meta-dioxane) (405 grams), phenol (120 grams) and diethyl sulfate (1.6 grams) was placed in a reaction flask and heated for fifty minutes at a temperature of 100° C. to 120° C. At the end of this period, the liquid resin was poured into molds and cured for sixteen hours at a temperature of 150° C. The cured polymer was a hard material with the following properties:

Heat distortion_____° C.__ 149
Hardness, durometer "D"_____ 81
Impact strength (Izod), ft.lbs./in. of notch_____ 0.75

A thin bar (5" x ½" x ⅛") of this material was tested for flammability according to ASTM–D635–44. After it was ignited, the bar burned for twenty-three minutes before the flame extinguished.

*Example 2*

A mixture of 3,9-divinylspirobi(meta-dioxane) (318 grams) and 1,1,3 - tris(hydroxyphenyl)propane (160 grams) was heated at a temperature of 100° C. until it became homogeneous. The reaction mixture was allowed to cool to a temperature of 53° C., and mixed alkanesulfonic acid (0.72 gram) was then added. The liquid pre-condensate was poured into molds and cured at a temperature of 150° C for a period of six hours. The resulting polymer was hard and had a smooth, glossy finish. It had the following properties:

Heat distortion_____° C__ 192
Impact strength (Izod), ft.lbs./in. of notch_____ 0.4

A thin bar (5" x ½" x ⅛") was tested for flammability according to ASTM–D635–44. After ignition, the bar burned for fourteen minutes before the flame extinguished.

*Example 3*

A charge of 3,9-divinylspirobi(meta-dioxane) (64 grams), 2,2-hydroxyphenyl)propane (24.6 grams) and diethyl sulfate (0.39 gram) was heated with stirring for fifteen minutes at a temperature of 110° C. The liquid mixture was then poured into molds and cured for eight hours at a temperature of 150° C. The resulting polymer was a hard, tough, glossy solid which was tested for flammability according to ACTM–D635–44. A thin bar 5" x ½" x ⅛") burned for eight and one-half minutes after it was ignited.

*Example 4*

A charge of 85 percent ortho-phosphoric acid (40 grams) was heated to a temperature of 70° C. Phosphorus pentoxide (40 grams) was then added at such a rate that the temperature of the mixture did not rise above 140° C. After cooling, a light-colored viscous mixture was recovered ("condensed" phosphoric acids).

*Example 5*

A mixture of 3,9-divinylspirobi(meta-dioxane) (54 grams) and phenol (16 grams) was melted and "condensed" phosphoric acids (0.6 gram) prepared according to the method of Example 4 was added. The reaction mixture was heated for thirty minutes at a temperature of 180° C. After this reaction period, the mixture was cooled to a temperature of 50° C. and an additional 1.6 grams of "condensed" phosphoric acids were added. The total amount of "condensed" phosphoric acids added was 3.04 percent by weight of the total charge. The reaction mixture was then poured into molds and cured for a period of sixteen hours at a temperature of 100° C. The resulting light brown, hard polymer was tested according to ASTM–D635–44 for flammability. After the bar (5" x ½" x ⅛") was ignited with a flame, it burned for forty-one seconds. When it was ignited a second time, it burned for thirty-five seconds before extinguishing.

*Example 6*

Phenol (16 grams) and 3,9-divinylspirobi(meta-dioxane) (54 grams) were melted together and 0.6 gram of "condensed" phosphoric acids prepared according to the method of Example 4 was added. After being heated at a temperature of 80° C. for thirty minutes, the mixture was cooled to a temperature of 50° C. and an additional 4.1 grams of "condensed" phosphoric acids were added. The total additive was 6.4 percent by weight of the charge. The material was then cured for a period of sixteen hours at a temperature of 100° C. and a polymer was recovered which was similar in appearance and properties to the product prepared in Example 5. A thin bar (5" x ½" x ⅛") was ignited in a flammability test and it burned for a period of seventeen seconds before extinguishing.

*Example 7*

Phenol (16 grams) and 3,9-divinylspirobi(meta-dioxane) (54 grams) were melted together and 0.6 gram of "condensed" phosphoric acids was added. After being heated at a temperature of 80° C. for a period of thirty minutes, the mixture was cooled to 50° C. and an additional 6.9 grams of "condensed" phosphoric acids were added. The total additive was 9.7 percent by weight of the resin mixture. The material was cured for a period of sixteen hours at a temperature of 100° C. The resulting hard polymer was tested for flammability by the standard test method and it was self-extinguishing within thirty seconds.

*Example 8*

A reaction flask was charged with 3,9-divinylspirobi-(meta-dioxane) (60 grams), 1,1,3-tris(hydroxyphenyl)-propane (30 grams) and octylphenyl acid phosphate (0.27 gram). The reaction mixture was heated for fifteen minutes at a temperature of 130° C., then it was cooled to 67° C. and 3.74 grams of "condensed" phosphoric acids were added (4.0 weight percent). The liquid pre-condensate was poured into molds and cured for a period of sixteen hours at a temperature of 100° C. A thin bar (5" x ½" x ⅛") of the material was tested for flammability and it burned for fifty-five seconds before extinguishing. When the bar was ignited a second time, it burned for sixty seconds before extinguishing.

*Example 9*

A mixture of 3,9-divinylspirobi(meta-dioxane) (60 grams), 1,1,3-tris(hydroxyphenyl)propane (30 grams) and octylphenyl acid phosphate (0.27 gram) was heated for a period of ten minutes at a temperature of 130° C., then it was cooled to 55° C. and 5.4 grams of "condensed" phosphoric acids were added. The liquid pre-condensate was poured into molds and cured for a period of sixteen hours at a temperature of 100° C. The resulting polymer was a hard, glossy material which was tested for flammability by the standard method. After ignition, the material was self-extinguishing within five seconds. When the test was repeated, the flame was again extinguished within five seconds.

*Example 10*

The mixture of 3,9-divinylspirobi(meta-dioxane) (60 grams) 1,1,3-tris(hydroxyphenyl)propane (30 grams) and octylphenyl acid phosphate (0.27 gram) was reacted for fifteen minutes at a temperature of 130° C., then it was cooled to 60° C. and 6.84 grams of "condensed" phosphoric acids were added (7.1 percent by weight). The material was cured in the usual manner and the resulting hard, glossy polymer was tested for flammability by the standard method. When the material was ignited, the flame was extinguished in five seconds. The test was repeated and the flame was extinguished in three seconds.

*Example 11*

A mixture of 3,9-divinylspirobi(meta-dioxane) (42.6 grams) and 2,2-(p-hydroxyphenyl)propane (17.3 grams) was heated until it was homogeneous, then it was cooled to a temperature of 55° C. and 4 grams of "condensed" phosphoric acids were added (6.25 percent by weight). The mixture was heated for a short time at a temperature of 150° C. and then it was poured into molds and cured for eight hours at a temperature of 150° C. A hard, solid polymer was recovered and tested for flammability by the standard method. The material was self-extinguishing within five seconds in three different tests.

What is claimed is:

1. A curable composition comprising a phenol having at least two hydrogen atoms ortho-para to a phenolic hydroxyl group, between 3 and 15 weight percent, based on total composition weight, of "condensed" phosphoric acids having the formula $H-(PO_3H)_x-OH$, wherein $x$ is an integer greater than 1, and 3,9-divinylspirobi(meta-dioxane).

2. A curable composition comprising a phenol having at least two hydrogen atoms ortho-para to a phenolic hydroxyl group, between 3 and 15 weight percent, based on total composition weight, of "condensed" phosphoric acids having the formula $H-(PO_3H)_x-OH$, wherein $x$ is an integer greater than 1, and 3,9-dipropenylspirobi(meta-dioxane).

3. A curable composition comprising a phenol having at least two hydrogen atoms ortho-para to a phenolic hydroxyl group, between 3 and 15 weight percent, based on total composition weight, of "condensed" phosphoric acids having the formula $H-(PO_3H)_x-OH$, wherein $x$ is an integer greater than 1, and 3,9-diisopropenylspirobi(meta-dioxane).

4. A curable composition comprising a phenol having at least two hydrogen atoms ortho-para to a phenolic hydroxyl group, between 3 and 15 weight percent, based on total composition weight, of "condensed" phosphoric acids having the formula $H-(PO_3H)_x-OH$, wherein $x$ is an integer greater than 1, and 3,9-di(1-chlorovinyl)spirobi(meta-dioxane).

5. A curable composition comprising phenol, between 3 and 15 weight percent, based on total composition weight, of "condensed" phosphoric acids having the formula $H-(PO_3H)_x-OH$, wherein $x$ is an integer greater than 1, and 3,9-divinylspirobi(meta-dioxane).

6. A curable composition comprising 2,2-(p-hydroxyphenyl)propane, between 3 and 15 weight percent, based on total composition weight, of "condensed" phosphoric acids having the formula $H-(PO_3H)_x-OH$, wherein $x$ is an integer greater than 1, and 3,9-divinylspirobi(meta-dioxane).

7. A curable composition comprising 1,1,3-tris(hydroxyphenyl)propane, between 3 and 15 weight percent, based on total composition weight, of "condensed" phosphoric acids having the formula $H-(PO_3H)_x-OH$, wherein $x$ is an integer greater than 1, and 3,9-divinylspirobi(meta-dioxane).

8. A curable composition comprising a phenol having at least two hydrogen atoms ortho-para to a phenolic hydroxyl group, between 3 and 15 weight percent, based on total composition weight, of "condensed" phosphoric acids having the formula $H-(PO_3H)_x-OH$, wherein $x$ is an integer greater than 1, and 3,9-dialkenylspirobi(meta-dioxane) having between two and eighteen carbon atoms in each alkenyl radical.

9. A process for preparing flame-resistant resins which comprises heating at reaction temperature a phenol having at least two hydrogen atoms ortho-para to a phenolic hydroxyl group, between 3 and 15 weight percent, based on total composition weight, of "condensed" phosphoric acids having the formula $H-(PO_3H)_x-OH$, wherein $x$ is an integer greater than 1, and 3,9-dialkenylspirobi(meta-dioxane) having between two and eighteen carbon atoms in each alkenyl radical.

10. A process for preparing flame-resistant resins which comprises heating at reaction temperature a phenol having at least two hydrogen atoms ortho-para to a phenolic hydroxyl group, between 3 and 15 weight percent, based on total composition weight, of "condensed" phosphoric acids having the formula $H-(PO_3H)_x-OH$, wherein $x$ is an integer greater than 1, and 3,9-divinylspirobi(meta-dioxane) in the presence of an acidic catalyst.

11. The process of claim 10 wherein the acidic catalyst is dialkyl sulfate.

12. The process of claim 11 wherein the dialkyl sulfate is diethyl sulfate.

13. A process for preparing polymers which comprises heating at a temperature between 100° C. and 150° C. a phenol having at least two hydrogen atoms ortho-para to a phenolic hydroxyl group with 3,9-dialkenylspirobi(meta-dioxane) having between two and eighteen carbon atoms in each alkenyl radical in the presence of an acidic catalyst to form a partially cured mixture, and heating at a temperature between 100° C. and 150° C. said partially cured mixture with between 3 and 15 weight percent, based on total composition weight, of "condensed" phosphoric acids having the formula $H-(PO_3H)_x-OH$, wherein $x$ is an integer greater than 1, to form a solid flame-resistant resin.

14. The composition of claim 1 cured at a temperature between 100° C. and 150° C.

15. A solid flame-resistant resin prepared by the process of claim 13.

References Cited in the file of this patent

UNITED STATES PATENTS

| | | |
|---|---|---|
| 2,915,499 | Wilson et al. | Dec. 1, 1959 |
| 2,915,500 | Wilson et al. | Dec. 1, 1959 |
| 2,915,501 | Guest et al. | Dec. 1, 1959 |

UNITED STATES PATENT OFFICE
CERTIFICATION OF CORRECTION

Patent No. 3,010,942                November 28, 1961

Howard R. Guest et al.

It is hereby certified that error appears in the above numbered patent requiring correction and that the said Letters Patent should read as corrected below.

Column 1, line 11, after "-dioxane" insert a closing parenthesis; column 2, first formula, for the right-hand portion reading "HC-C=CH$_2$" read -- HC-CH=CH$_2$ --; same column 2, fourth formula, for the left-hand portion reading "CH$_3$CH=CH-CH" read -- CH$_3$-CH=CH-CH --; column 4, line 43, for "viscocity" read -- viscosity --; column 5, line 46, for "2,2-hydroxyphenyl)" read -- 2,2-(p-hydroxyphenyl) --; line 52, for "ACTM-D635—44." read ASTM-D635—44. --; same line insert an open parenthesis before "5""; column 8, line 48, for the claim reference numeral "1" read -- 8 --.

Signed and sealed this 1st day of May 1962.

(SEAL)

Attest:

ERNEST W. SWIDER
Attesting Officer

DAVID L. LADD
Commissioner of Patents